(12) United States Patent
Delst (10) Patent No.: US 12,481,852 B2
(45) Date of Patent: Nov. 25, 2025

(54) ARTICLE INCLUDING AN IMAGE INCLUDING TWO OR MORE TYPES OF PIXELS

(71) Applicant: VIAVI SOLUTIONS INC., Chandler, AZ (US)

(72) Inventor: Cornelis Jan Delst, Fairfax, CA (US)

(73) Assignee: VIAVI SOLUTIONS INC., Chandler, AZ (US)

(*) Notice: Subject to any disclaimer, the term of this patent is extended or adjusted under 35 U.S.C. 154(b) by 0 days.

(21) Appl. No.: 17/983,025

(22) Filed: Nov. 8, 2022

(65) Prior Publication Data
US 2023/0153557 A1   May 18, 2023

Related U.S. Application Data

(60) Provisional application No. 63/278,949, filed on Nov. 12, 2021.

(51) Int. Cl.
G06K 15/12    (2006.01)

(52) U.S. Cl.
CPC ... *G06K 15/129* (2013.01); *G06K 2215/0094* (2013.01)

(58) Field of Classification Search
CPC ......... G06K 15/129; G06K 2215/0094; H04N 1/00838; H04N 1/54
See application file for complete search history.

(56) References Cited

U.S. PATENT DOCUMENTS

| | | |
|---|---|---|
| 3,795,011 A | 2/1974 | Ohta |
| 4,175,958 A | 11/1979 | Naganuma et al. |
| 4,178,850 A | 12/1979 | Helmig |
| 4,242,428 A | 12/1980 | Davis |
| 4,448,867 A | 5/1984 | Ohkubo et al. |
| 4,448,870 A | 5/1984 | Imai et al. |
| 4,457,980 A | 7/1984 | Daniels |
| 5,180,650 A | 1/1993 | Sacripante et al. |
| 5,744,269 A | 4/1998 | Bhattacharya et al. |
| 5,759,636 A | 6/1998 | Taylor et al. |

(Continued)

FOREIGN PATENT DOCUMENTS

| | | | |
|---|---|---|---|
| AU | 2012100985 A4 * | 7/2012 | ............ B41M 3/14 |
| CN | 100516145 C | 7/2009 | |

(Continued)

OTHER PUBLICATIONS

Chapter 6.4 Electrophotographic Process, Graphic Communications Open Textbook Collective. (2015). Graphic Design and Print Production Fundamentals. Victoria, B.C.: BCcampus. (Year 2015), 10 pages.Retrieved from (https://courses.lumenlearning.com/suny-graphicdesign/chapter/6-4-electrophotographic-process/).

(Continued)

*Primary Examiner* — Ted W Barnes
(74) *Attorney, Agent, or Firm* — Mannava & Kang, P.C.

(57) ABSTRACT

An article, including a substrate; an image printed on the substrate; in which the image includes two or more types of pixels; in which the two or more types of pixels are chosen from an RGB pixel, an RGBW pixel, and a hybrid pixel; and in which at least one type of pixel, of the two or more types of pixels, includes an optically variable pigment is disclosed. A method of making and using the article is also disclosed.

20 Claims, 5 Drawing Sheets

(56) References Cited

U.S. PATENT DOCUMENTS

| | | | |
|---|---|---|---|
| 6,020,908 A | 2/2000 | Moledina | |
| 6,321,049 B1 | 11/2001 | Endoh | |
| 6,578,478 B2 | 6/2003 | Doppler | |
| 6,590,600 B2 | 7/2003 | Haas | |
| 6,643,032 B1 | 11/2003 | Crean et al. | |
| 7,121,209 B2 | 10/2006 | Vaidyanathan et al. | |
| 7,164,498 B2 | 1/2007 | Van Bael | |
| 7,399,351 B2 | 7/2008 | Jackson et al. | |
| 7,433,635 B2 | 10/2008 | Chou et al. | |
| 7,592,117 B2 | 9/2009 | Jackson et al. | |
| 7,678,523 B2 | 3/2010 | Hiroko et al. | |
| 8,025,952 B2* | 9/2011 | Raksha | B41M 7/0027 283/109 |
| 8,033,477 B2 | 10/2011 | Jones et al. | |
| 8,211,225 B2 | 7/2012 | Hollman et al. | |
| 8,614,039 B2 | 12/2013 | Nair et al. | |
| 8,859,176 B2 | 10/2014 | Kodokura et al. | |
| 8,895,219 B2* | 11/2014 | Ganapathiappan | G03G 9/125 523/210 |
| 9,019,514 B2* | 4/2015 | Rich | B41M 5/0023 358/468 |
| 9,070,075 B2 | 6/2015 | Barndt et al. | |
| 9,316,993 B2 | 4/2016 | Veres et al. | |
| 9,323,175 B2 | 4/2016 | Hiral et al. | |
| 9,383,669 B2 | 7/2016 | Takahashi et al. | |
| 9,497,356 B1* | 11/2016 | Pjanic | H04N 1/32256 |
| 9,544,467 B2 | 1/2017 | Chen | |
| 9,557,674 B2 | 1/2017 | Hirai et al. | |
| 9,579,879 B2* | 2/2017 | Raksha | B42D 25/369 |
| 9,618,868 B2 | 4/2017 | Tyagi et al. | |
| 9,791,797 B2 | 10/2017 | Sambhy et al. | |
| 10,343,436 B2* | 7/2019 | Raksha | B41M 3/148 |
| 11,193,002 B2* | 12/2021 | Raksha | B05D 5/065 |
| 11,230,127 B2* | 1/2022 | Raksha | B05D 5/061 |
| 2003/0202193 A1 | 10/2003 | Yokochi | |
| 2003/0210318 A1 | 11/2003 | Detig | |
| 2005/0094212 A1 | 5/2005 | Asai | |
| 2005/0094265 A1* | 5/2005 | Wang | G03B 21/00 359/443 |
| 2005/0214666 A1 | 9/2005 | Schulze-Hagenest et al. | |
| 2006/0023327 A1* | 2/2006 | Coombs | G02B 5/0816 359/883 |
| 2006/0082844 A1 | 4/2006 | White | |
| 2006/0191437 A1 | 8/2006 | Mader | |
| 2006/0222393 A1 | 10/2006 | De Jong | |
| 2009/0214833 A1 | 8/2009 | Oyanagi et al. | |
| 2010/0027035 A1 | 2/2010 | Stelter et al. | |
| 2010/0231631 A1 | 9/2010 | Hosaka et al. | |
| 2011/0139025 A1 | 6/2011 | Kitakami et al. | |
| 2011/0170037 A1* | 7/2011 | Nirmal | H04N 9/3108 349/68 |
| 2011/0255134 A1 | 10/2011 | Shigeta et al. | |
| 2011/0262858 A1 | 10/2011 | Nair et al. | |
| 2012/0113367 A1* | 5/2012 | Kitson | G02F 1/13475 445/24 |
| 2013/0070268 A1* | 3/2013 | Yoshida | H04N 1/60 358/1.9 |
| 2013/0295502 A1* | 11/2013 | Tyagi | G03G 9/0926 430/97 |
| 2013/0323633 A1 | 12/2013 | Takahashi et al. | |
| 2013/0328995 A1* | 12/2013 | Lazzari | B42D 25/00 347/232 |
| 2014/0090579 A1* | 4/2014 | Delst | C09C 3/04 106/400 |
| 2014/0362443 A1* | 12/2014 | Markantes | G02B 5/285 359/584 |
| 2015/0042702 A1* | 2/2015 | Jiang | G02B 1/005 345/694 |
| 2015/0070738 A1* | 3/2015 | Itoh | H04N 1/6077 358/523 |
| 2015/0138641 A1* | 5/2015 | Delst | G02B 5/286 359/584 |
| 2015/0183258 A1 | 7/2015 | Raymond et al. | |
| 2015/0352882 A1* | 12/2015 | Jolic | B42D 25/351 359/619 |
| 2016/0009075 A1 | 1/2016 | Lefebvre et al. | |
| 2016/0034795 A1* | 2/2016 | Morovic | G06K 15/1878 358/1.9 |
| 2016/0107471 A1* | 4/2016 | Landrock | H01J 37/3174 359/569 |
| 2016/0182764 A1* | 6/2016 | Akasaka | B41J 2/2054 358/1.9 |
| 2018/0017877 A1 | 1/2018 | Kaiser | |
| 2018/0134062 A1* | 5/2018 | Hansen | B42D 25/455 |
| 2018/0178577 A1 | 6/2018 | Lister | |
| 2018/0273777 A1 | 9/2018 | Lefebvre et al. | |
| 2019/0023051 A1 | 1/2019 | Kusaka et al. | |
| 2019/0225006 A1* | 7/2019 | Kohlmann | B42D 25/369 |
| 2019/0299336 A1* | 10/2019 | Nashner | B23K 26/0006 |
| 2019/0299691 A1 | 10/2019 | Raksha et al. | |
| 2020/0021846 A1 | 1/2020 | Thoreau et al. | |
| 2020/0079102 A1 | 3/2020 | Ochiai et al. | |
| 2020/0299529 A1* | 9/2020 | Lahr | C08K 5/01 |
| 2021/0043128 A1 | 2/2021 | Kubota | |
| 2021/0102072 A1 | 4/2021 | Witzman et al. | |
| 2021/0347193 A1 | 11/2021 | James et al. | |
| 2022/0286582 A1* | 9/2022 | Mizuno | H04N 1/00045 |
| 2023/0128872 A1 | 4/2023 | Delst et al. | |
| 2023/0129015 A1 | 4/2023 | Delst et al. | |
| 2023/0129906 A1 | 4/2023 | Delst et al. | |

FOREIGN PATENT DOCUMENTS

| | | | |
|---|---|---|---|
| EP | 1640160 A1 | 3/2006 | |
| EP | 3421551 A1 | 1/2019 | |
| JP | H06214440 | 8/1994 | |
| JP | 2000258929 | 9/2000 | |
| JP | 2008221642 A | 9/2008 | |
| JP | 2009056625 A | 3/2009 | |
| JP | 4478721 B2 | 6/2010 | |
| JP | 2012224017 A | 11/2012 | |
| JP | 5949166 B2 | 7/2016 | |
| JP | 2019142168 A * | 8/2019 | |
| WO | 2006041658 A1 | 4/2006 | |
| WO | WO-2010028285 A1 * | 3/2010 | B41M 5/0023 |
| WO | 2016124315 | 8/2016 | |
| WO | WO-2016124315 A1 * | 8/2016 | B41J 2/2107 |
| WO | 2018024760 | 2/2018 | |
| WO | WO-2018024760 A1 * | 2/2018 | B41M 3/14 |
| WO | WO-2020174153 A1 * | 9/2020 | B42D 25/23 |
| WO | 2021018771 A1 | 2/2021 | |
| WO | WO-2023069430 A1 * | 4/2023 | H04N 1/409 |

OTHER PUBLICATIONS

Hangzhou Epsilon Chemical Co., Ltd, Iron oxide blue (General grade iron oxide), year 2016, 3 pages.

L. Comelissen & Son, "Cadmium Red Pigment", year 2011, 2 pages.

* cited by examiner

ARTICLE INCLUDING AN IMAGE INCLUDING TWO OR MORE TYPES OF PIXELS

RELATED APPLICATION

This application claims priority to U.S. Provisional Application No. 63/278,949, filed Nov. 12, 2021, the entire disclosure of which is incorporated in its entirety.

FIELD OF THE INVENTION

The present application is directed to an article, including a substrate; an image printed on the substrate; in which the image includes two or more types of pixels; in which the two or more types of pixels are chosen from an RGB pixel, an RGBW pixel, and a hybrid pixel; and in which at least one type of pixel, of the two or more types of pixels, includes an optically variable pigment. A method of making an article and a method of using the article are also disclosed.

BACKGROUND OF THE INVENTION

Generally, machine printed color images have been recorded with colorants using subtractive color blending, such as cyan, magenta, yellow, and black (CMYK). The subtractive colorants, widely referred to as process colors, are printed in specific pixels with defined colored areas, on a white substrate to produce an image. If it is desired to print on a black or other dark colored substrate, then a solid white ink must be printed first to create white. However, these color images have a limited optical performance because the brightness of the image is never more than the brightness of the background lightness as the color is subtractive to that level.

Additive colors are opaque by definition and can exhibit a more specular reflection, which could result in improved optical performance. However, if an additive color area is mis-registered relative to where it should be and as a result overlaps with an adjacent additive color area, only the color on top in the overlap would contribute to the color blend, resulting in a color bias within the color image. Additionally, printing an image with RGB optically variable pigments only requires a large optically variable area, and can result in an optically variable aspect that is not desirable, or not desirable in all areas of the image.

In order to increase the brightness, non-spherical red, green and blue and broadband reflective metallic pigments that act as highly reflective little mirrors, which have a much higher reflectivity than paper or other commonly used white substrates, have been used. The broadband reflective metallic pigment is used as a white component because it reflects white colored illumination as a white color. However, an image printed only with these pigments can result in lower visibility of optically variable aspects with a large coverage of the W component that is not optically variable, which is important for security documents.

What is needed is an article including an image with optically variable aspects and high optical performance, for example, by utilizing one or more types of pixels formed from various combinations of pigments. The image can include both obvious and latent optical aspects. The image can be formed in a cost effective manner by selectively using optically variable pigments and broadband reflective pigments.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

In an aspect, there is disclosed an article, including a substrate; an image printed on the substrate; in which the image includes two or more types of pixels; in which the two or more types of pixels are chosen from an RGB pixel, an RGBW pixel, and a hybrid pixel; and in which at least one type of pixel, of the two or more types of pixels, includes an optically variable pigment.

In another aspect, there is discloses a method of making an article, comprising: printing on a substrate an image; wherein the image includes two or more types of pixels; wherein the two or more types of pixels are chosen from an RGB pixel, an RGBW pixel, and a hybrid pixel; and wherein at least one type of pixel, of the two or more types of pixels, includes an optically variable pigment

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings.

In its broad and varied embodiments, disclosed herein is an article, including a substrate; an image printed on the substrate; in which the image includes two or more types of pixels; in which the two or more types of pixels are chosen from an RGB pixel, an RGBW pixel, and a hybrid pixel; and in which at least one type of pixel, of the two or more types of pixels, includes an optically variable pigment. The article can have at least one of the following properties: reduced cost (e.g., because of selective and reduced use of optically variable pigments), improved optical performance (e.g., because of the use of broadband reflective pigments), and controlled optically variable aspects (e.g., control and placement of optically variable pigments).

The specific method by which pigments are placed or printed, either as pigmented ink, paint, as dry or wet toner or by other means in pixel areas intended to be colored, is not relevant for the invention. The colored areas are referred to as pigmented and are assumed to a have a coating with full coverage with ideal performing pigments for the drawings and explanation. A non-ideal pigment coverage and pigment performance or coating can reduce optical performance of the image, yet does not influence the invention.

A pixel is traditionally described in relation to digital images as including red, blue, and green each having a value from 0 to 255, and forming a color. The traditional pixel emits light. As used herein, a "pixel" is an area defined by four areas reserved for an opaque pigment, such as an optically variable pigment and/or a broadband reflective pigment. A plurality of pixels can be printed on a substrate to form an image. An inventive pixel reflects light. The types of pixels used to form the image of the article are discussed more fully below.

The article can be a security article, such as banknotes, checks, passports, postage stamps, identity cards, driver's licenses, or the like, with an optically variable aspect that can be utilized to prevent forgery or counterfeiting.

The substrate can be a material capable of receiving a pigment, such as a paper, plastic, glass, laminate, card stock, or the like. The substrate can be in a continuous roll, or a sequence of substrate sheets, or have any discrete or continuous shape. In addition, at least a portion of an upper surface of the substrate can receive two or more types of pixels to form an image.

The image, such as a color image, can include two or more types of pixels. The image does not include only one type of pixel, such as only pixels formed of additive color pigments or only pixels formed of broadband reflective pigments. The image can be from two or more types of pixels to an unlimited number of types of pixels. The number of pixels, of two or more types, can vary depending upon the quality/clarity of the image, wherein a higher quality/clarity image includes a greater number of pixels as compared to a lower quality/clarity image.

Figure 1A:
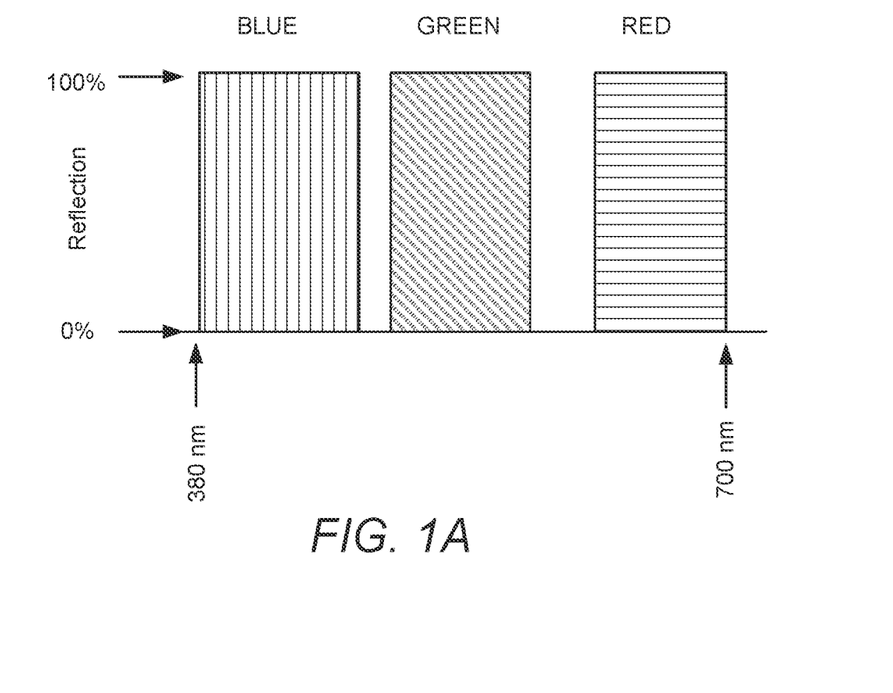
FIG. 1A is an illustration of three additive color pigments and their spectral response in reflection, for theoretical ideal pigments.

At least one type of pixel, of the two or more types of pixels, includes an optically variable pigment. An optically variable pigment is a pigment that can exhibit a change in its optical properties, such as a change in hue with viewing and/or illumination angle. The change in optical properties does not include a change in brightness and/or lightness only (e.g., an aluminum reflective pigment is not an optically variable pigment in the context of this filing simply because it changes in brightness with viewing and/or illumination angle). An optically variable pigment can exhibit a noticeable change in hue, such as greater than or equal to a 10 degree change in hue. FIG. 1A illustrates three separate optically variable pigments, e.g., a blue pigment, a green pigment, and a red pigment.

Figure 1B:
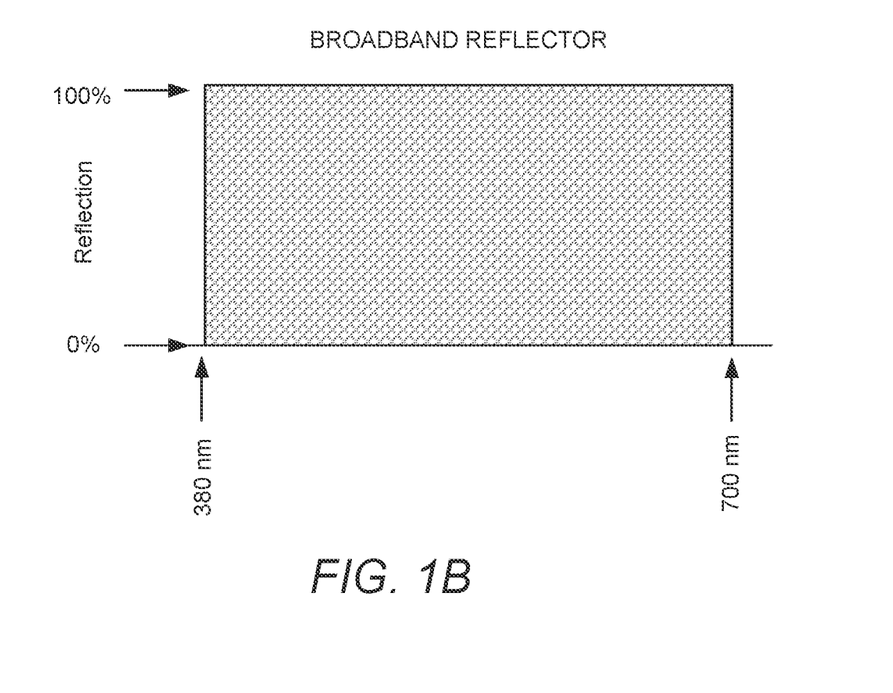
FIG. 1B is an illustration of a broadband reflective pigment, the spectral response in reflection, for a theoretical ideal pigment.

These optically variable pigments are less reflective than a broadband reflective pigment, as shown in FIG. 1B. A broadband reflective pigment is a pigment that can reflect light evenly in a wavelength range from about 380 nm to about 700 nm. A broadband reflective pigment can be defined as a colorless reflective pigment that appears to be grey, white, or black. For example, a broadband reflective pigment can be without significant chroma, between −20 and 20 for both a* and b* in Cie Lab color space. An example of a broadband reflective pigment is an aluminum ball milled or vacuum coated pigment.

Figure 2A:
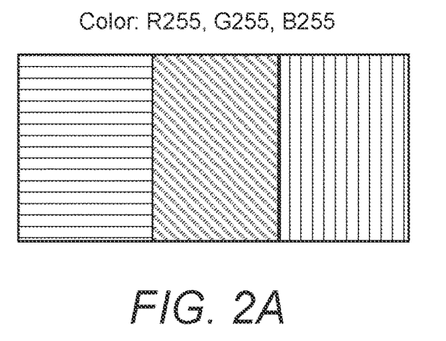
FIG. 2A is an RGB pixel according to an aspect of the invention.
Figure 2B:
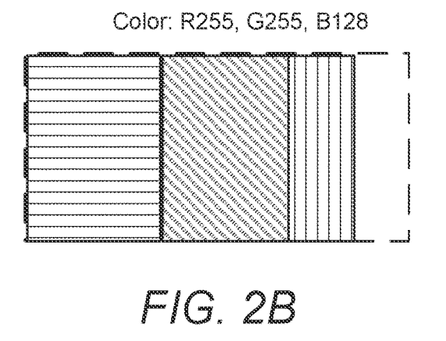
FIG. 2B is an RGB pixel according to another aspect of the invention.
Figure 3A:
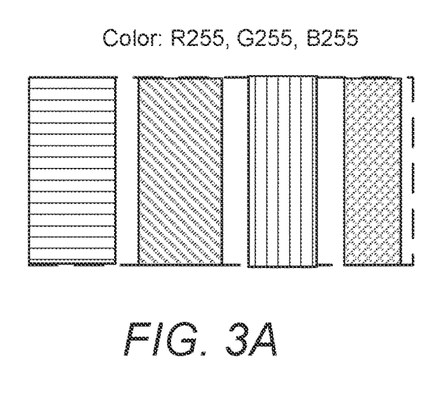
FIG. 3A is a hybrid pixel according to an aspect of the invention.
Figure 3B:
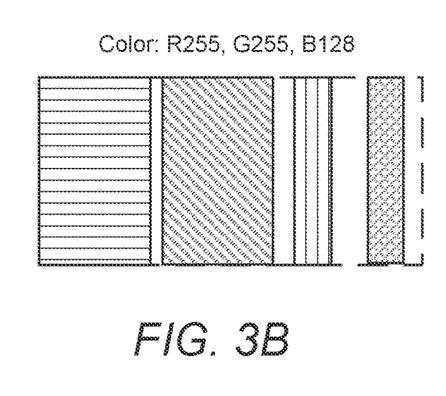
FIG. 3B is a hybrid pixel according to another aspect of the invention.
Figure 4A:
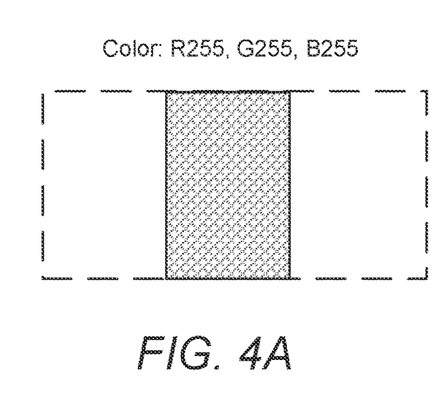
FIG. 4A is an RGBW pixel according to an aspect of the invention.
Figure 4B:
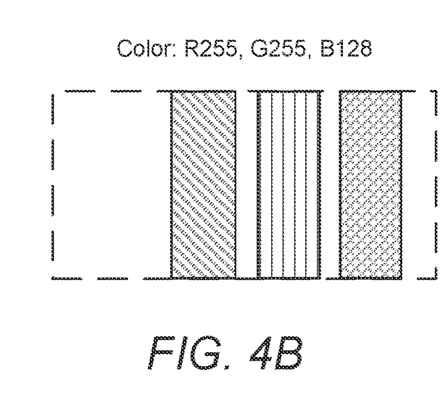
FIG. 4B is an RGBW pixel according to another aspect of the invention.

With additive color, space needs to be reserved in a pixel for each pigment. There are three different types of pixels used in forming the image and each type of pixel can include different pigment combinations and configurations. Referring to FIGS. 1A and 1B as a legend, the three different types of pixels are a RGB pixel (as shown in FIGS. 2A, 2B), a hybrid pixel (as shown in FIGS. 3A, 3B), and a RGBW pixel (as shown in FIGS. 4A, 4B). A color channel in a pixel can have a value from 0 to 255 per channel, with a color of a pixel defined by three channels. FIGS. 2A, 3A, and 4A illustrate how the three different types of pixels can be designed to have a same color using different pigments. Similarly, FIGS. 2B, 3B, and 4B also illustrate how the three different types of pixels can be designed to have a same color using different pigments. Two or more types of pixels can form an image.

FIGS. 2A and 2B are each an example of an RGB pixel, which includes from 1 to 3 pigments. Each pigment of the 1 to 3 pigments can be chosen from red, green, and blue. FIG. 2A illustrates an RGB pixel with an equal area (e.g., R255, G255, and B255) of blue pigment, green pigment, and red pigment, and proportional to the R, G and B color channel value in the widely used RGB image definition as commonly used for electronic image file storage. FIG. 2B illustrates an RGB pixel with a smaller area of blue pigment, equal areas of green and red pigments, and an area within the pixel that is void of pigment (i.e., the area defined by the dash lines and to the right of the blue pigment).

FIGS. 3A and 3B are each an example of a hybrid pixel that includes a broadband reflective pigment, and from 1 to 3 pigments, in which each pigment of the 1 to 3 pigments can be chosen from red, green, and blue. FIG. 3A illustrates nearly equal amounts of red, green, blue, and broadband reflective pigment within the hybrid pixel. The hybrid pixel also includes small areas on either side of the broadband reflective pigment that are void of pigment. FIG. 3B illustrates a hybrid pixel with lesser amounts of blue and broadband reflective pigment, as compared to red pigment and green pigment. The hybrid pixel also includes void areas between each pigment.

The size of each pigmented area in a pixel is proportional to the channel value for the pixel and can be determined differently for each type of pixel, e.g., the RGB pixel, the RGBW pixel, and the hybrid pixel. For a RGB pixel, there are three pigmented areas that are each sized according to the corresponding value for that pixel in a colored channel.

For a RGBW pixel, the reflection level of the lowest of the three values of R, G and B is created with the reflection of the broadband reflector. The other two colored areas use this reflection as part of the reflection in that part of the spectrum and use a colored area to add reflection in the part of the spectrum to create the reflected spectrum shape. The hybrid pixel uses a smaller area for the broadband reflector than needed to create the reflection for the lowest of the three colors as well as three other colors in the pixel to create the spectral response. This creates a theoretically identical white light reflection for spectral response for the RGB, RGBW and hybrid pixels created for the three pixel configurations.

The spectral response for other than white light is different for a RGB pixel, a RGBW pixel, and hybrid pixels.

In addition to changing the viewing angle, illumination of colored light is an additional method to make a latent image, formed by the configuration of different pixel types, visible. As an example, red illumination will have a low reflection in areas, of a pixel, created with green or blue pigments only, but will reflect more from pixels comprising a broadband reflector reserved area. The pixels will appear identical under white light and appear different under colored light, creating a contrast in the image that appears under colored illumination.

FIGS. 4A and 4B are each an example of a RGBW pixel that includes a broadband reflective pigment, and up to 2 pigments, in which each pigment of the up to 2 pigments can be chosen from red, green, and blue. FIG. 4A illustrates a broadband reflective pigment and areas void of pigment within the RGBW pixel. FIG. 4B illustrates an RGBW pixel with a blue pigment, a green pigment, and a broadband reflective pigment with void areas between each pigment.

The pigment can be a broadband reflective pigment. In one example, the materials for the broadband reflective pigment can include any materials that have reflective characteristics in the desired spectral range. For example, any material with a reflectance ranging from 50% to 100% in the desired spectral range. An example of a reflective material can be aluminum, which has good reflectance characteristics, is inexpensive, and easy to form into or deposit as a thin layer. Other materials can also be used in place of aluminum. For example, copper, silver, gold, platinum, palladium, nickel, cobalt, niobium, chromium, tin, and combinations, blends or alloys of these or other metals can be used as reflective materials. In an aspect, the material for the broadband reflective pigment can be a white or light colored metal. In other examples, the broadband reflective pigment can include, but is not limited to, the transition and lanthanide metals and combinations thereof; as well as metal carbides, metal oxides, metal nitrides, metal sulfides, a combination thereof, or mixtures of metals and one or more of these materials.

A broadband reflective pigment can reflect light in multiple spectral ranges, such as visible light (from about 380 nm to about 800 nm), ultraviolet light (from about 200 nm to about 400 nm), and infrared light (from about 800 nm to about 1 mm). The infrared wavelength range can include near infrared, short-wave infrared, medium wave infrared, and long wave infrared. The visible light can include violet (from about 380 nm to about 450 nm), blue (from about 450 nm to about 495 nm), green (from about 495 nm to about 570 nm), yellow (from about 570 nm to about 590 nm), orange (from about 590 nm to about 620 nm), and red (from about 620 nm to about 750 nm).

The pigment can be an optically variable pigment, such as a color shifting pigment. A color shifting pigment can exhibit a first color at a first viewing angle and a second color at a second viewing angle that is different from the first viewing angle. A color shifting pigment can include the following multilayered optical structure: absorber layer/dielectric layer/reflective layer/dielectric layer/absorber layer. The reflective layer can be the metallic reflective layer discussed above with regard to the broadband reflective pigment.

The reflective layer can be a metallic reflective layer. The terms "metallic" or "metallic layer" used herein, unless otherwise stated, are intended to include all metals, metal blends and alloys, pure metal or metal alloy containing materials, compound, compositions, and/or layers. The reflective layer can be opaque. In one example, any materials that have reflective characteristics can be used. Non-limiting examples of a material with reflecting characteristics include aluminum, silver, copper, gold, platinum, tin, titanium, palladium, nickel, cobalt, rhodium, niobium, chromium, and compounds, combinations or alloys thereof. Examples of suitable reflective alloys and compounds include bronze, brass, titanium nitride, and the like, as well as alloys of the metals listed above such as silver-palladium. The reflective layer can have an inherent color such as copper, gold, silver copper alloys, brass, bronze, titanium nitride, and compounds, combinations or alloys thereof. The pigment can be encapsulated with a non-conductive layer, such as an organic polymer or metal oxide.

The dielectric layer can act as a spacer in the pigment. The dielectric layer can be formed to have an effective optical thickness for a particular wavelength. The dielectric layer can be optionally clear, or can be selectively absorbing so as to contribute to the color effect of a pigment. The optical thickness is a well-known optical parameter defined as the product $\eta d$, where $\eta$ is the refractive index of the layer and d is the physical thickness of the layer. Typically, the optical thickness of a layer is expressed in terms of a quarter wave optical thickness (QWOT) that is equal to $4\eta rf/\lambda$, where $\lambda$ is the wavelength at which a QWOT condition occurs. The optical thickness of the dielectric layer can range from about 2 QWOT at a design wavelength of about 400 nm to about 9 QWOT at a design wavelength of about 700 nm, and for example about 2-6 QWOT at 400-700 nm, depending upon the color shift desired. The dielectric layer can have a physical thickness of about 100 nm to about 800 nm, and for example from about 140 nm to about 650 nm, depending on the color characteristics desired.

Suitable materials for a dielectric layer include those having a "high" index of refraction, defined herein as greater than about 1.65, as well as those have a "low" index of refraction, which is defined herein as about 1.65 or less. The dielectric layer can be formed of a single material or with a variety of material combinations and configurations. For example, the dielectric layer can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layer can be formed partially or entirely of high/low dielectric optical stacks. When a dielectric layer is formed partially with a dielectric optical stack, the remaining portion of the dielectric layer can be formed with a single material or various material combinations and configurations as described above.

Non-limiting examples of suitable high refractive index materials for the dielectric layer include zinc sulfide (ZnS), zinc oxide (ZnO), zirconium oxide ($ZrO_2$), titanium dioxide ($TiO_2$), diamond-like carbon, indium oxide ($InO_3$), indiumtin-oxide (ITO), tantalum pentoxide ($Ta_2O_5$), cerium oxide ($CeO_2$), yttrium oxide ($Y_2O_3$), europium oxide ($Eu_2O_3$), iron oxides such as (II) diiron(III) oxide ($FeO_4$) and ferric oxide ($Fe_2O$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide (WO), combinations thereof, and the like.

Non-limiting examples of suitable low refractive index materials for the dielectric layer includes silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$, $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The absorber layer can include any absorber material, including both selective absorbing materials and nonselective absorbing materials. For example, the absorber layer can be formed of nonselective absorbing metallic materials deposited to a thickness at which the absorber layer is at least partially absorbing, or semi-opaque. An example of a non-selective absorbing material can be a gray metal, such as chrome or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium, carbon, graphite, silicon, geranium, cermet and various combinations, mixtures, compounds, or alloys of the above absorber materials that may be used to form the absorber layer.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/VV), titanium mixed with niobium (Ti/Nb), and titanium mixed with silicon (Ti/Si), and combinations thereof. Other examples of suitable compounds for the absorber layer include titanium-based compounds such as titanium silicide ($TiSi_2$), titanium boride ($TiB_2$), and combinations thereof. Alternatively, the absorber layer can be composed of a titanium-based alloy disposed in a matrix of Ti, or can be composed of Ti disposed in a matrix of a titanium-based alloy.

In an aspect, the pigment can include a single cavity, such as a single cavity color shifting pigment. In another aspect, the pigment can include a dual cavity, such as a dual cavity color shifting pigment. A "single cavity" is understood to mean the metallic reflective layer, and a dielectric layer, and optionally an absorber layer on a single side of pigment. For example, a single cavity can include the metallic reflective layer with a dielectric layer on each side of the metallic reflective layer. A "dual cavity" is understood to mean the metallic reflective layer, a first dielectric layer, an absorber layer, a second dielectric, and optionally a second absorber layer on a single side of the pigment. For example, the dual cavity can include the following structure, and variations thereof: dielectric/absorber/dielectric/metallic reflective layer/dielectric. The layers in each of the single cavity pigment and the dual cavity pigment are disclosed above.

One of ordinary skill in the art would appreciate that each of the disclosed color shifting pigments can include any number of layers in any order. The disclosed color shifting pigments (single cavity color shifting pigment and/or dual cavity color shifting pigment) can each be symmetric, i.e., have the same layers on each side of the metallic reflective layer. The color shifting pigments (single cavity color shifting pigment and/or dual cavity color shifting pigment) can each be asymmetric, i.e., have different layers on each side of the metallic reflective layer. Additionally, the materials in any particular layer can be the same or different from the materials in any other layer.

Figure 5A:
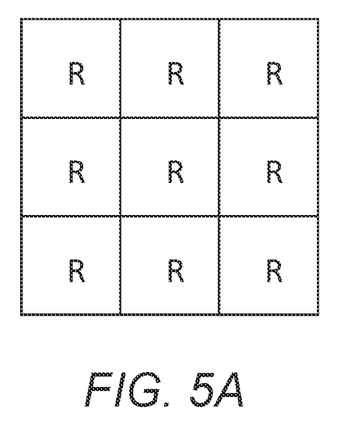
FIG. 5A is a comparative image.
Figure 5B:
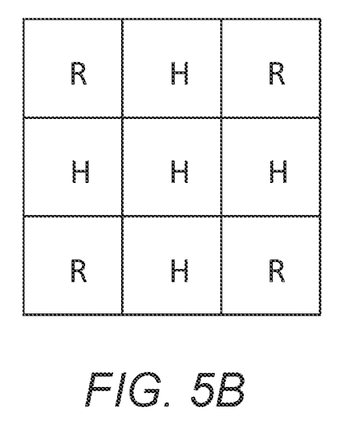
FIGS. 5B-5D are illustrations of an image according to an aspect of the invention.
Figure 5C:
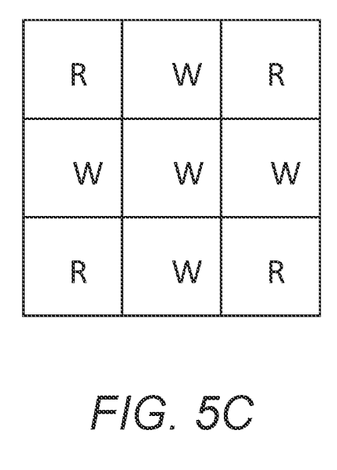
Figure 5D:
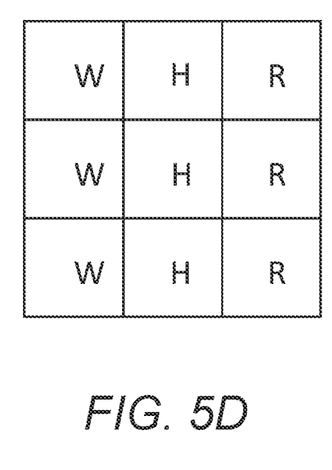

The image can be two images, such as a first image (obvious) visible at normal; and a second image (latent) visible at an angle to normal resulting from the placement of the two or more types of pixels. FIGS. 5A-5D are different images formed using one or more types of pixels. FIG. 5A is a comparative image formed with only a single type of pixel R, which is an RGB pixel. The image of FIG. 5A would exhibit poor optical variability and low brightness. FIG. 5B is an inventive image including two or more types of pixels, such as an RGB pixel (R), and a hybrid pixel (H). At an angle, a "+" would be visible as a latent image. In an aspect, the RGB pixel and/or the hybrid pixel can include an optically variable pigment, so that the optically variable pigment is present in a pattern in the image. FIG. 5C is an inventive image including two or more types of pixels, such as an RGB pixel (R), and a RGBW pixel (W). At an angle, a "+" would be visible as a latent image. FIG. 5D is an inventive image including two or more types of pixels, such as an RGB pixel (R), a RGBW pixel (W), and a hybrid pixel (H). The image can show one color at one angle and a color gradient at different ranges of viewing angles.

The image can include a first portion printed with a plurality of RGB pixels, and a second portion printed with a plurality of RGBW pixels. The first portion can have a first color shift, and the second portion can have a second color shift that is different from the first color shift. In an aspect, the image can include a first portion printed with a plurality of RGB pixels, and a second portion printed with a plurality of hybrid pixels. In another aspect, the image includes a first portion printed with a plurality of RGBW pixels, and a second portion printed with a plurality of hybrid pixels.

The image can include the two or more types of pixels in any arrangement, such as patterned or random. In an aspect, the image includes an RGB pixel adjacent to an RGBW pixel. In another aspect, the image includes an RGB pixel adjacent to a hybrid pixel. In a further aspect, the image includes an RGBW pixel adjacent to a hybrid pixel.

A method of making of making an article, can comprise: printing on a substrate an image; wherein the image includes two or more types of pixels; wherein the two or more types of pixels are chosen from an RGB pixel, an RGBW pixel, and a hybrid pixel; and wherein at least one type of pixel, of the two or more types of pixels, includes an optically variable pigment. The substrate, image, pixels, and pigments are as described above. The two or more types of pixels can be printed in register with one another to form the image.

Figure 6A:
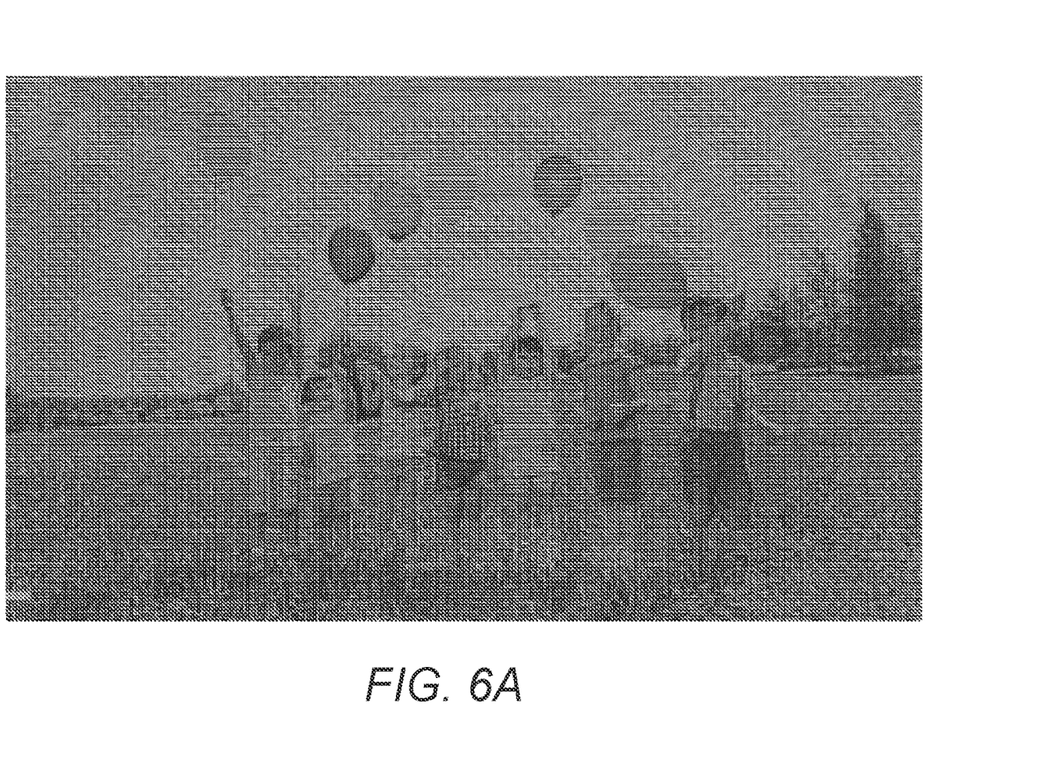
FIG. 6A is a gray scale of an article including an image (obvious) according to an aspect of the invention.
Figure 6B:
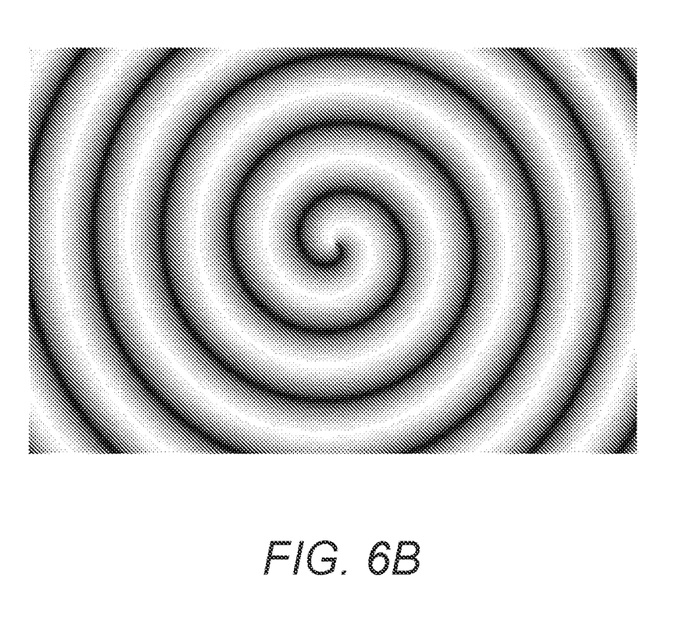
FIG. 6B is a depiction of an image, which is a latent image, present in FIG. 6A.
Figure 6C:
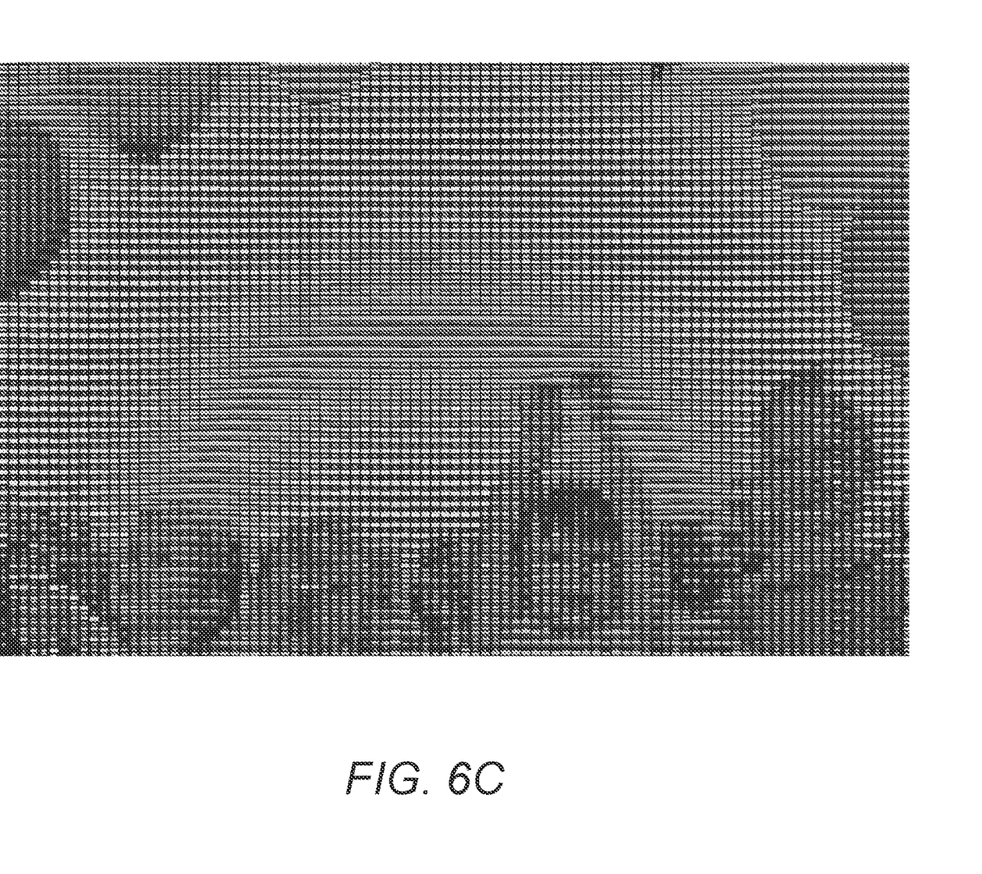
FIG. 6C is a magnified version of FIG. 6A showing the plurality of pixels that form the image (obvious) of FIG. 6A and the latent image of FIG. 6B.

The image can be two images, such as a first image (obvious, as shown in FIG. 6A) visible at normal; and a second image (latent, as shown in FIG. 6B) visible at an angle to normal resulting from the placement of the two or more types of pixels. The image can be printed with a transition area between the two or more types of pixels in order to enhance visualization from the obvious image to the latent image. Transitions can be gradual to reduce mismatch or immediate to create a crisp latent image. For example, as shown in FIG. 6C, the transition area can include a first portion having a majority of one type of pixel having a first optically variable pigment, adjacent to a second portion with an equal amount of two types of pixels each with optically variable pigments, adjacent to a third portion with a majority of a second type of pixel having a second optically variable pigment. The first optically variable pigment has a different color shift than the second optically variable pigment. The optically variable pigment can be present in one type of pixel in a ratio determined by a gray scale value. In this manner, the method can further include modulating a placement of the two or more types of pixels to form a latent image.

A method of using the article includes viewing the article from normal to see an obvious image; tilting the article at an angle different from normal; and viewing the article to see a latent image. By viewing the latent image, a user can verify the authenticity of the article.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed:
1. An article, comprising:
a substrate; and
an image printed on the substrate;
wherein the image includes two or more types of pixels;
wherein the two or more types of pixels are chosen from an RGB pixel, an RGBW pixel, and a hybrid pixel;
wherein at least one type of pixel, of the two or more types of pixels, includes an optically variable pigment;
wherein the hybrid pixel and the RGBW pixel both include a broadband reflective pigment, and the hybrid pixel includes from 1 to 3 pigments, wherein each pigment, of the 1 to 3 pigments, is chosen from red, green, and blue; and
wherein the hybrid pixel uses a smaller pigmented area for the broadband reflective pigment than the RGBW pixel to create a pixel color for a pixel in the image.
2. The article of claim 1, wherein the RGB pixel includes from 1 to 3 pigments; and wherein each pigment, of the 1 to 3 pigments, is chosen from red, green, and blue.
3. The article of claim 1, wherein the RGBW pixel includes a up to 2 pigments; wherein each pigment, of the up to 2 pigments, can be chosen from red, green, and blue.
4. The article of claim 1, wherein the image is two images; wherein a first image, of the two images, is visible at normal; and wherein a second image, of the two images, is visible at an angle to normal resulting from the placement of the two or more types of pixels.
5. The article of claim 1, wherein the image includes a first portion printed with a plurality of RGB pixels, and a second portion printed with a plurality of RGBW pixels.
6. The article of claim 5, wherein the first portion has a first color shift, and the second portion has a second color shift that is different from the first color shift.
7. The article of claim 1, wherein the image includes a first portion printed with a plurality of RGB pixels, and a second portion printed with a plurality of hybrid pixels.
8. The article of claim 1, wherein the image includes a first portion printed with a plurality of RGBW pixels, and a second portion printed with a plurality of hybrid pixels.
9. The article of claim 1, wherein the optically variable pigment is present in a pattern in the image.
10. The article of claim 1, wherein the image includes an RGB pixel adjacent to an RGBW pixel.
11. The article of claim 1, wherein the image includes an RGB pixel adjacent to a hybrid pixel.
12. The article of claim 1, wherein the image includes an RGBW pixel adjacent to a hybrid pixel.
13. The article of claim 1, wherein the substrate is chosen from a paper, a plastic, and a glass.
14. The article of claim 1, wherein the pixel has a same white light reflection for spectral response if either the hybrid pixel or the RGBW pixel is used for the pixel in the image.
15. A method of making an article, comprising:
printing on a substrate an image;
wherein the image includes two or more types of pixels;
wherein the two or more types of pixels are chosen from an RGB pixel, an RGBW pixel, and a hybrid pixel;
wherein at least one type of pixel, of the two or more types of pixels, includes an optically variable pigment;
wherein the hybrid pixel and the RGBW pixel both include a broadband reflective pigment, and the hybrid pixel includes from 1 to 3 pigments, wherein each pigment, of the 1 to 3 pigments, is chosen from red, green, and blue; and
wherein the hybrid pixel uses a smaller pigmented area for the broadband reflective pigment than the RGBW pixel to create a pixel color for a pixel in the image.
16. The method of claim 15, wherein the image is two images; wherein a first image, of the two images, is visible at normal; and wherein a second image, of the two images, is visible at an angle to normal resulting from the placement of the two or more types of pixels.
17. The method of claim 15, wherein the optically variable pigment is present in one type of pixel in a ratio determined by a gray scale value.
18. The method of claim 15, wherein the image is printed with a transition area between the two or more types of pixels.
19. The method of claim 15, wherein the two or more types of pixels are printed in register with one another to form the image.
20. The method of claim 15, further comprising modulating a placement of the two or more types of pixels to form a latent image.

* * * * *